United States Patent
Horvath et al.

(10) Patent No.: US 7,412,043 B2
(45) Date of Patent: Aug. 12, 2008

(54) AUTOMATIC CALLBACK METHOD FOR A PACKET-ORIENTED NETWORK

(75) Inventors: Ernst Horvath, Vienna (AT); Karl Klaghofer, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1079 days.

(21) Appl. No.: 10/468,506

(22) PCT Filed: Jan. 30, 2002

(86) PCT No.: PCT/DE02/00324

§ 371 (c)(1),
(2), (4) Date: Aug. 19, 2003

(87) PCT Pub. No.: WO02/067560

PCT Pub. Date: Aug. 29, 2002

(65) Prior Publication Data

US 2004/0066927 A1 Apr. 8, 2004

(30) Foreign Application Priority Data

Feb. 19, 2001 (DE) .............................. 101 07 701

(51) Int. Cl.
*H04M 3/42* (2006.01)

(52) U.S. Cl. .................... 379/201.01; 370/259; 370/352

(58) Field of Classification Search ............ 379/201.01; 370/352, 259

See application file for complete search history.

(56) References Cited

U.S. PATENT DOCUMENTS

| 5,794,143 | A | | 8/1998 | McCarthy et al. |
| 5,966,652 | A | * | 10/1999 | Coad et al. ............... 455/412.1 |
| 5,987,323 | A | * | 11/1999 | Huotari ....................... 455/433 |
| 6,151,507 | A | * | 11/2000 | Laiho et al. ................. 455/466 |
| 6,463,144 | B1 | * | 10/2002 | Dunn et al. ............ 379/210.01 |
| 6,804,509 | B1 | * | 10/2004 | Okon et al. ............... 455/414.1 |
| 6,970,546 | B2 | * | 11/2005 | Kent et al. ............. 379/207.02 |
| 2005/0111647 | A1 | * | 5/2005 | Mashinsky ............. 379/210.01 |

FOREIGN PATENT DOCUMENTS

| WO | 99/08434 | 2/1999 |
| WO | 00/78001 | 12/2000 |

* cited by examiner

*Primary Examiner*—Quynh H Nguyen
(74) *Attorney, Agent, or Firm*—Staas & Halsey LLP

(57) ABSTRACT

In cases when a called participant is not registered on a packet oriented network, a call-back request made by a calling subscriber is transmitted automatically to a substitutional device which is disposed in a network and assigned to the called subscriber. Preferably, the callback request is stored in a separate database. As soon as the called subscriber is registered in the network, the callback request is transmitted to the called subscriber.

19 Claims, 2 Drawing Sheets

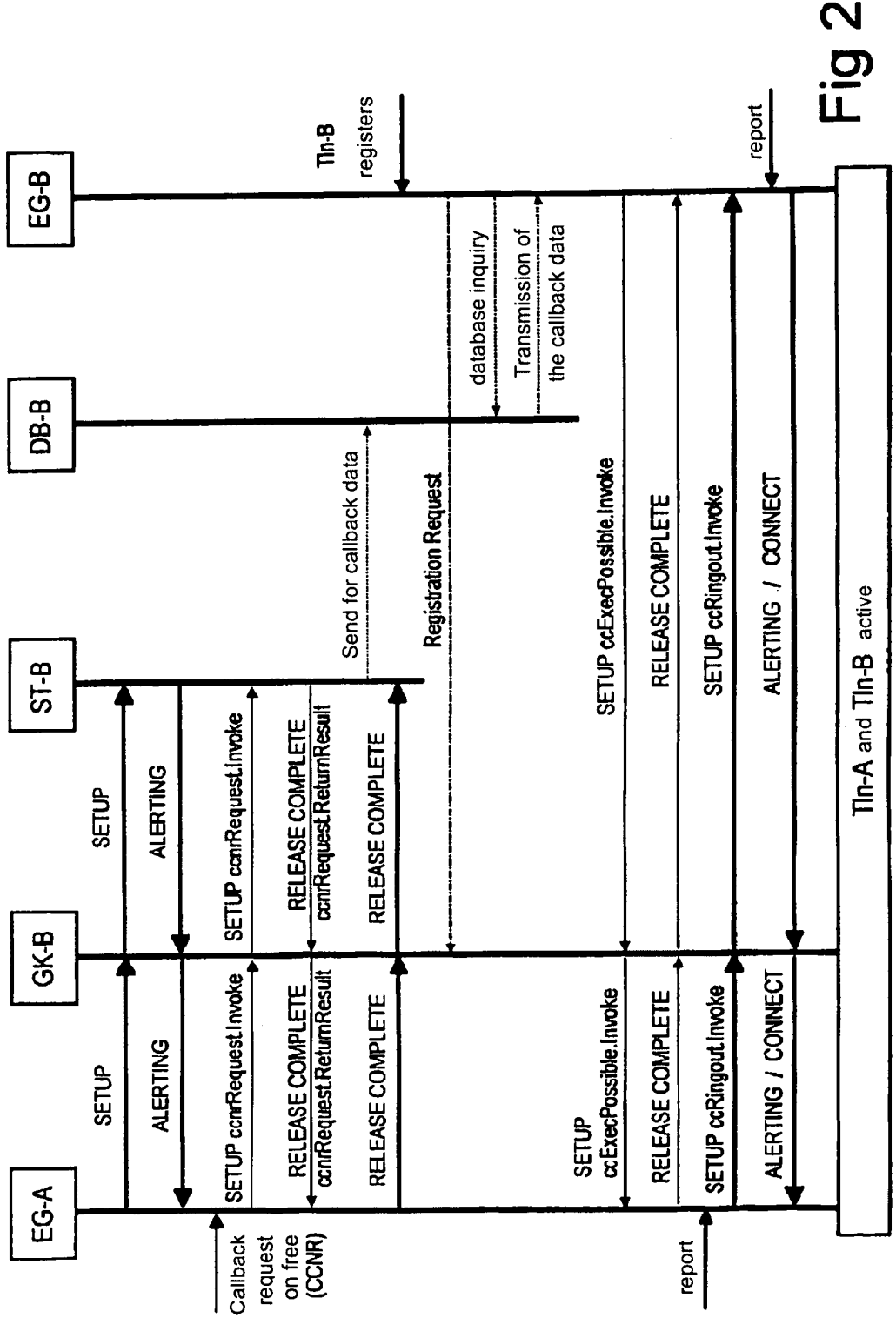

AUTOMATIC CALLBACK METHOD FOR A PACKET-ORIENTED NETWORK

CROSS REFERENCE TO RELATED APPLICATIONS

This application is based on and hereby claims priority to German Application No. 101 07 701.7 filed on Feb. 19, 2001, the contents of which are hereby incorporated by reference.

BACKGROUND OF THE INVENTION

From the product publication "Sonderausgabe telcom report und Siemens Magazin Com: ISDN im Büro—HICOM" [Special edition of telcom report and Siemens' Com magazine: ISDN in the Office—HICOM], Siemens AG, Berlin and Munich, 1985, in particular from pages 14 to 31, a communication system designed for information switching, in particular for voice data switching, is known which supports a large number of features such as automatic callback, call pickup, call forwarding, etc. It is furthermore known from the 1991 product publication "HICOM 300 Networking", reference number A31001-W-A30, issued by the company Siemens AG, how to link up communication systems into a—generally private—communication network and make features that are available locally on one communication system available throughout the network. The features are usually implemented across the network by a networking protocol, specific to the communication system, that is based on a timeslot-oriented transmission protocol.

This gives each subscriber of a communication system the possibility of activating or deactivating features, such as an automatic callback, on a network-wide basis. To do this the subscriber dials, for example, a feature-specific service code and the directory number of the terminal for which the relevant feature is to be activated or deactivated.

ITU-T (International Telecommunication Union) Recommendation H.450.9 describes a method for an implementation of the known "automatic callback" feature in packet-oriented networks according to the H.323 standard. Analogously to timeslot-oriented communication networks, a distinction is made here between two different cases:

1) automatic callback in the event of a "busy" destination subscriber (CCBS) and 2) automatic callback in the event of a "free" destination subscriber (CCNR).

A requirement of both variants is for the subscribers to be registered on the network via their respective terminals. Besides the two statuses "busy" and "free", in packet-oriented networks employing the Internet Protocol—IP for short—there is another status in which the subscriber is neither "busy" nor "free" but is "not registered". This is the case, for example, when an application implemented on the relevant terminal has not been launched or the terminal is inactive.

SUMMARY OF THE INVENTION

An object of the present invention is to specify a method by which the "automatic callback" feature can also be executed in packet-oriented networks in cases where a called subscriber is "not registered" on the network.

In the event that a called subscriber—or the terminal assigned to the called subscriber—is not registered on the packet-oriented network, then according to the invention a deputizing device—frequently referred to in the relevant literature as a proxy—will assume the functions of the called terminal. The deputizing device is generally implemented as a relevant function in a data processing device. The deputizing device allows the calling subscriber to place an automatic callback request with the called subscriber. As soon as the called subscriber registers on the packet-oriented network from a terminal, the callback request will be transmitted to this terminal and so will be available for executing the automatic callback.

In cases where the called subscriber—or the terminal assigned to the called subscriber—is registered on the network when a callback request is activated by the calling subscriber but de-registers from the network before the callback is executed, the callback request will automatically be stored in the network (IP-N). As soon as the called subscriber re-registers on the network, the callback request will be transmitted to the called subscriber and executed by that subscriber.

A major advantage of a method according to the invention is that it can easily be implemented in existing systems.

A further advantage of a method according to the invention lies in the called subscriber's ability to register from any terminal in the packet-oriented network, with the callback request being transmitted to the terminal on which the called subscriber has registered so that mobility required for the subscribers can be provided easily.

An advantage of embodiments of the invention is that old and thus generally no longer current requests are automatically removed from the system through the cancellation of callback requests on expiration of a period of time that can be pre-specified, thereby minimizing the load on the system due to monitoring of the callback requests.

BRIEF DESCRIPTION OF THE DRAWINGS

These and other objects and advantages of the present invention will become more apparent and more readily appreciated from the following description of an exemplary embodiment, taken in conjunction with the accompanying drawings of which:

FIG. 2 is a flowchart for elucidating the main operations that take place within a method according to the invention.

DETAILED DESCRIPTION OF THE PREFERRED EMBODIMENT

Figure 1:
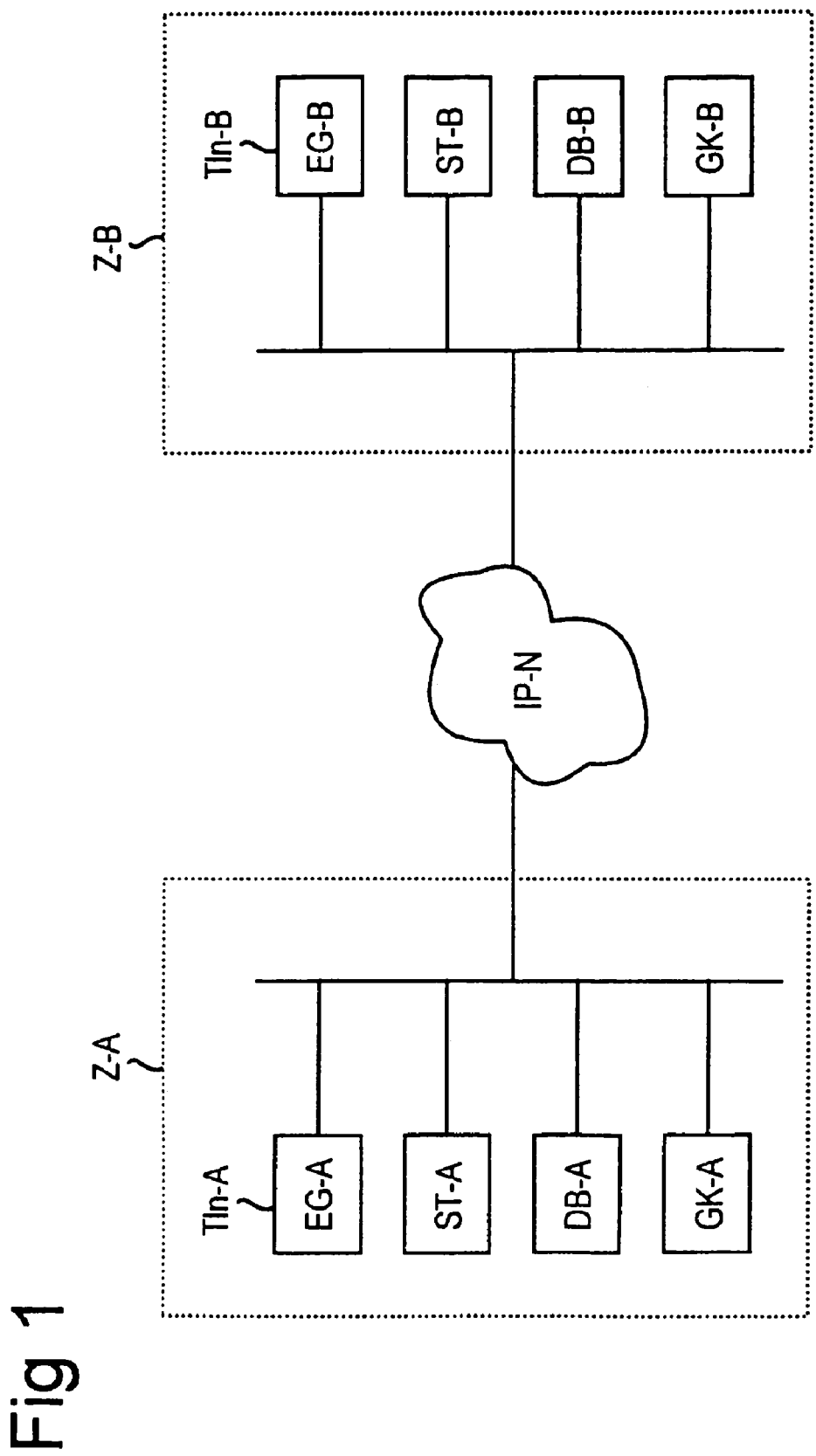
FIG. 1 is a block diagram for schematically representing the main functional units involved in a method according to the invention.

Reference will now be made in detail to the preferred embodiments of the present invention, examples of which are illustrated in the accompanying drawings, wherein like reference numerals refer to like elements throughout.

FIG. 1 shows a first and a second zone Z-A, Z-B which are interconnected via a packet-oriented network IP-N, for example a Local Area Network (LAN for short). Data is transmitted between the zones Z-A, Z-B over the packet-oriented network IP-N by the H.323 and H.225 standards known per se of the ITU (International Telecommunication Union).

A zone Z-A, Z-B in each case comprises what is called a gatekeeper GK-A, GK-B and several devices assigned to this gatekeeper GK-A, GK-B. Shown by way of example for each zone Z-A, Z-B is a terminal EG-A, EG-B assigned to a subscriber Tln-A, Tln-B, a deputizing device ST-A, ST-B, and a database DB-A, DB-B. Several zones are in turn combined into what is called a domain (not shown). A terminal EG-A, EG-B can be, for example, what is called an 'IP-Phone' or a 'personal computer' with a suitable application running on the personal computer.

Several terminals are usually assigned to a zone Z-A, Z-B, with the deputizing device ST-A, ST-B, the database DB-A, DB-B, and the gatekeeper GK-A, GK-B being assigned in this case jointly to the terminals. The deputizing device ST-A, ST-B, the database DB-A, DB-B and the gatekeeper GK-A, GK-B of a zone Z-A, Z-B can be either separate devices or a number of units combined into a single device. What is essentially performed by the gatekeeper GK-A, GK-B of a zone Z-A, Z-B is registration of the devices assigned to it and bi-directional address conversion between what are called alias addresses employed within a zone Z-A, Z-B and the addresses required by the packet-oriented network IP-N for connection setup. An alias address can be, for example, a telephone number or an e-mail address used by a subscriber Tln-A, Tln-B for a connection setup.

In the present exemplary embodiment the terminals EG-A, EG-B assigned to the subscribers Tln-A, Tln-B are in each case assigned to different zones Z-A, Z-B. The subscribers Tln-A, Tln-B or the terminals EG-A, EG-B can, however, also be assigned to a common zone Z-A, Z-B or a common domain.

In the present embodiment of the invention a connection setup is initiated proceeding from a first subscriber Tln-A registered on the first gatekeeper GK-A of the first zone D-A to a second subscriber Tln-B of the second zone Z-B. This connection setup can be a voice connection, a video connection or a multimedia connection. The exemplary embodiment is based on the assumption that all calls to the second subscriber Tln-B are routed via the second gatekeeper GK-B. It is of no significance for this exemplary embodiment whether the calls from or to the first subscriber Tln-A are or are not routed via the first gatekeeper GK-A.

FIG. 2 shows a flowchart for elucidating the main messages that are exchanged by a method according to the invention. The unbroken thick arrows here represent a connection setup message for establishing a connection to a useful-data channel, the unbroken thin arrows represent a signaling message, the dot-dash arrows represent a message according to the known H.225.0 RAS protocol of the ITU, and the dotted arrows represent a database protocol message.

In the present exemplary embodiment the first terminal EG-A sends a connection setup message "SETUP" to the second gatekeeper GK-B according to the H.323 standard. The first terminal EG-A can alternatively also transmit the connection setup message "SETUP" to the first gatekeeper GK-A, which forwards the connection setup message "SETUP" to the second gatekeeper GK-B. The second gatekeeper GK-B determines whether the second subscriber Tin-B is currently registered on the second gatekeeper GK-B. If this is not the case, the second gatekeeper GK-B will forward the received connection setup message "SETUP" to the second deputizing device ST-B. The second deputizing device ST-B then functions as a deputy for the second terminal EG-B and sends a message "ALERTING" according to the H.225.0 standard back to the first terminal EG-A.

On receipt of the message "ALERTING", the first terminal EG-A is set to a status in which the feature "automatic callback on free" can be initiated on the first terminal EG-A according to the H.450.9 standard. For this, a new signaling connection containing the H.450.9 operation "ccnrRequest.Invoke" in a signaling message "SETUP" according to the H.225.0 standard is set up between the first terminal EG-A and the second gatekeeper GK-B. This signaling message "SETUP" is, as previously, forwarded from the second gatekeeper GK-B to the second deputizing device ST-B. The operation "ccnrRequest.Invoke" contains the directory number of the first subscriber Tln-A, the directory number of the second subscriber Tln-B and, optionally, a callback identifier and information about the required service type (voice, video, multimedia, . . . ). This data will be referred to below as callback data.

The second deputizing device ST-B accepts the callback request of the first subscriber Tln-A and sends an acknowledgement message "RELEASE COMPLETE" according to the H.225.0 standard together with an operation "ccnrRequest.ReturnResult" according to the H.450.9 standard back to the first terminal EG-A. On receipt of the acknowledgement message "RELEASE COMPLETE", the first terminal EG-A releases the still existing connection of the original connection setup in the alerting status with the message "RELEASE COMPLETE" according to the H.225.0 standard.

In an ensuing operation, the second deputizing device ST-B transmits the callback data to the second database DB-B, in which the callback data is buffered. The second database DB-B can be physically located on the same device on which the second deputizing device ST-B has been implemented. Any database protocol, such as ODBC, JDBC, XML, . . . , can be used as the interface and protocol between the second deputizing device ST-B and the second database DB-B.

If the second subscriber Tin-B registers on the second gatekeeper GK-B within a period of time that can be pre-specified—within 24 hours, for example—communication will take place between the second terminal EG-B and the second database DB-B. The period of time can be monitored in the first terminal EG-A by, for example, what is called an "SS-CC service duration timer" according to the H.450.9 standard. Alongside other information—the user profile, for example—the second database DB-B then also transmits information about any outstanding callbacks, i.e. the callback data, to the second terminal EG-B.

The second terminal EG-B is then able to execute the callback procedure according to the H.450.9 standard. In the present exemplary embodiment this is effected by sending an availability operation "ccExecPossible.Invoke" to the first terminal EG-A as part of a signaling message "SETUP" according to the H.225.0 standard. It is assumed in the present exemplary embodiment that all calls to or from the second subscriber Tln-B are routed via the second gatekeeper GK-B. In the present exemplary embodiment the first terminal EG-A is registered on the first gatekeeper GK-A and has the status "free". The first subscriber Tln-A is called locally from the first terminal EG-A and the signaling connection between the first terminal EG-A and the second terminal EG-B is released from the first terminal EG-A by the signaling message "RELEASE COMPLETE".

If the first subscriber Tln-A answers, this will result in the actual "automatic callback" from the first terminal EG-A to the second terminal EG-B in the form of a connection setup according to the H.323 and H.450.9 standards by a connection setup message "SETUP", which contains an H.450.9 operation "ccRingout.Invoke". If the second subscriber Tln-B answers, connection setup messages "ALERTING" and "CONNECT" according to the H.225.0 standard will be transmitted from the second terminal EG-B to the first terminal EG-A. The connection setup messages "SETUP, "ALERTING", and CONNECT" contain information (not shown) needed in order to set up the useful-data channels according to the H.323 standard.

Transmission of the callback data by the second deputizing device ST-B to a second database DB-B makes it possible for the second subscriber Tln-B to register on the second gatekeeper GK-B from any terminal and for the callback to proceed nonetheless to its further implementation. This is facilitated by transmission of the callback data stored in the second database DB-B to the terminal on which the second subscriber Tln-B registers. A method according to the invention thus also provides a required mobility for the subscribers Tln-A, Tln-B.

According to a further embodiment of the invention, the second subscriber Tln-B is registered on the second gatekeeper GK-B when the callback request is activated by the first subscriber Tln-A. In this case, the callback data according to the H.450.9 standard will be stored not in the second deputizing device ST-B but in the second terminal EG-B. If, however, the callback is not executed because the second subscriber Tln-B has de-registered from the second gatekeeper GK-B, then proceeding from the second terminal EG-B the callback data will be transmitted to the second database DB-B. When the second subscriber Tln-B re-registers on the second gatekeeper GK-B, the callback data will be transmitted again to the terminal via which the second subscriber Tln-B has currently registered and the "automatic callback" will be executed as described above.

According to yet a further embodiment of the invention, the first subscriber Tln-A is not registered on the first gatekeeper GK-A when the callback is executed. If this is the case, then the first deputizing device ST-A of the first domain D-A will, together with the first database DB-A, assume the functions of the first terminal EG-A.

The first deputizing device ST-A will here respond to the availability operation "ccExecPossible.Invoke" of the second terminal EG-B instead of the first terminal EG-A with the operation "ccSuspend.Invoke" according to the H.450.9 standard.

When the first subscriber Tln-A re-registers on the first gatekeeper GK-A, the original callback request will be reactivated by an operation "ccResume.Invoke". It is possible here to ask the first subscriber Tln-A, before the callback is executed, whether the callback is still required. If the first subscriber Tln-A de-registers, the deputizing device ST-A will also assume the function of callback time monitoring from the first terminal EG-A and cancel the callback request by an operation "ccCancel.Invoke" according to the H.450.9 standard if the period of time that can be pre-specified is exceeded.

In the above exemplary embodiments the method according to the invention relates to H.323 communication networks. However, the method can also be used in other communication networks, for example in what are called SIP communication networks.

The invention has been described in detail with particular reference to preferred embodiments thereof and examples, but it will be understood that variations and modifications can be effected within the spirit and scope of the invention.

The invention claimed is:

1. A method for an automatic callback in a packet-oriented network, comprising:
   automatically transmitting, when a called subscriber is not registered on the packet-oriented network, a callback request from a calling subscriber to a deputizing device, which acts as the called subscriber by storing information and fulfilling protocol requirements associated with the called subscriber and is located in the packet-oriented network and assigned to the called subscriber;
   storing the callback request in the deputizing device; and
   automatically transmitting the callback request to the called subscriber for execution, as soon as the called subscriber registers on the packet-oriented network.

2. A method according to claim 1, further comprising automatically canceling the callback request on expiration of a predefined period of time.

3. A method according to claim 2, further comprising monitoring the expiration of the period of time by a terminal assigned to the calling subscriber.

4. A method according to claim 1,
   wherein the deputizing device is assigned to several subscribers, including the calling subscriber and the called subscriber, and
   wherein said method further comprises automatically transmitting the callback request to the deputizing device, if the calling subscriber is not registered on the packet-oriented network when the called subscriber executes the callback.

5. A method according to claim 4, further comprising monitoring the expiration of the period of time by the deputizing device.

6. A method according to claim 5, further comprising monitoring, by at least one gatekeeper, registration of the subscribers, including the calling subscriber and the called subscriber.

7. A method according to claim 6, wherein data is transmitted over the packet-oriented network using the H.225 and H.323 protocols of the International Telecommunication Union.

8. A method according to claim 7, wherein the callback request is implemented by messages based on the H.450.9 protocol of the International Telecommunication Union.

9. A method according to claim 6, wherein data, including the callback request, is transmitted over the packet-oriented network using the Session Initiation Protocol of the Internet Engineering Task Force.

10. A method for an automatic callback in a packet-oriented network, comprising:
    automatically storing a callback request in the packet-oriented network if the called subscriber is registered on the packet-oriented network when the callback request is activated by a calling subscriber but de-registers from the packet-oriented network before the callback request is executed; and
    automatically transmitting the callback request to the called subscriber for execution, as soon as the called subscriber registers again on the packet-oriented network,
    wherein the callback request is stored in a deputizing device, which acts as the called subscriber by storing information and fulfilling protocol requirements associated with the called subscriber and is assigned to the called subscriber.

11. A method according to claim 10, further comprising automatically canceling the callback request on expiration of a predefined period of time.

12. A method according to claim 11, further comprising monitoring the expiration of the period by a terminal assigned to the calling subscriber.

13. A method according to claim 10, further comprising automatically transmitting the callback request to a second deputizing device located in the packet-oriented network and assigned to the calling subscriber, if the calling subscriber is not registered on the packet-oriented network when the called subscriber executes the callback.

14. A method according to claim 13, further comprising monitoring the expiration of the period of time by the deputizing device.

15. A method according to claim 14, further comprising assigning the second deputizing device to several subscribers, including the calling subscriber.

16. A method according to claim 13, further comprising monitoring, by at least one gatekeeper, registration of the subscribers, including the calling subscriber.

17. A method according to claim 16, wherein data is transmitted over the packet-oriented network using the H.225 and H.323 protocols of the International Telecommunication Union.

18. A method according to claim 17, wherein the callback request is implemented by messages based on the H.450.9 protocol of the International Telecommunication Union.

19. A method according to claim 16, wherein data, including the callback request, is transmitted over the packet-oriented network by the Session Initiation Protocol of the Internet Engineering Task Force.

* * * * *